Aug. 8, 1961  
P. F. WARNER  
2,995,503  
METHOD AND APPARATUS FOR ELECTRICAL PRECIPITATION  
OF INSOLUBLE GEL FROM LINEAR POLYMER SOLUTIONS  
Filed Oct. 11, 1957  
4 Sheets-Sheet 1

INVENTOR.
P. F. WARNER
BY Hudson and Young
ATTORNEYS

INVENTOR.
P. F. WARNER
BY Hudson and Young
ATTORNEYS

United States Patent Office 2,995,503
Patented Aug. 8, 1961

2,995,503
METHOD AND APPARATUS FOR ELECTRICAL PRECIPITATION OF INSOLUBLE GEL FROM LINEAR POLYMER SOLUTIONS
Paul F. Warner, Borger, Tex., assignor to Phillips Petroleum Company, a corporation of Delaware
Filed Oct. 11, 1957, Ser. No. 690,182
15 Claims. (Cl. 204—180)

This invention relates to the removal of impurities from polymers. In one of its more specific aspects, this invention relates to the removal of gels from solutions of hydrocarbon polymers. In a still more specific aspect, this invention relates to the simultaneous removal of gels and inorganic materials from solutions of olefin polymers.

This application is a continuation-in-part of my copending application Serial No. 643,144, filed February 28, 1957, now abandoned.

The polymerization of butadiene to form liquid polymers of butadiene is well-known and a preferred process is disclosed and claimed in U.S. 2,631,175, issued March 10, 1953, to W. W. Crouch. The process as described, comprises polymerization of 1,3-butadiene in the presence of an alkali metal catalyst and a suitable polymer solvent or diluent, the reaction being carried out under carefully controlled reaction conditions, particularly temperature, catalyst conditions and concentration, quantity of solvent, and rate of butadiene addition; recovery of the product by some appropriate means such as by treatment with a quantity of water followed by introduction of carbon dioxide to react with the alkali metal and organo-alkali metal compounds and to precipitate alkali metal carbonates, removal of the precipitate, and stripping to separate the diluent from the liquid polymer. When operating according to the process of the above described invention, a liquid polymer of high molecular weight is produced. The polybutadiene thus produced is a substantially colorless transparent liquid.

One of the problems encountered in the production of high molecular weight liquid olefin polymers is that of removing the catalyst used in the polymerization. Gel is sometimes produced in the polymerization and it is desirable to remove this gel at least for certain uses. If the catalyst is removed by gravitational means, i.e., centrifuging, settling and etc., at least a substantial part of the gel remains in solution. Filtering normally removes both gel and catalyst but if a substantial amount of gel is present, the filter medium plugs almost immediately upon the introduction of the solution, and therefore, the filtering medium cannot be used under these circumstances with any degree of success. Furthermore, filtering is not a satisfactory means of catalyst removal in some polymerization processes such as in the polymerization of butadiene to a high molecular weight liquid polybutadiene in the presence of finely divided alkali metal catalyst.

It is therefore an object of this invention to provide an improved method for the removal of gel from solutions of polymers. It is also an object of this invention to provide an improved method for the removal of catalyst from the polymer produced in a polymerization reaction. A further object of this invention is the provision of a method for the simultaneous removal of gel and catalyst from a solution of a polymer. Other and further advantages and objects of this invention will be apparent to one skilled in the art upon study of the disclosure of the present invention.

Broadly, the invention contemplates the removal of gel from a solution containing the same in admixture with a polymer by subjecting the solution to an electrostatic field whereby the gel is precipitated or agglomerated and is simultaneously or subsequently removed.

FIGURE 1 of the drawing is a schematic flow diagram of a preferred embodiment of the invention.

Figure 1:
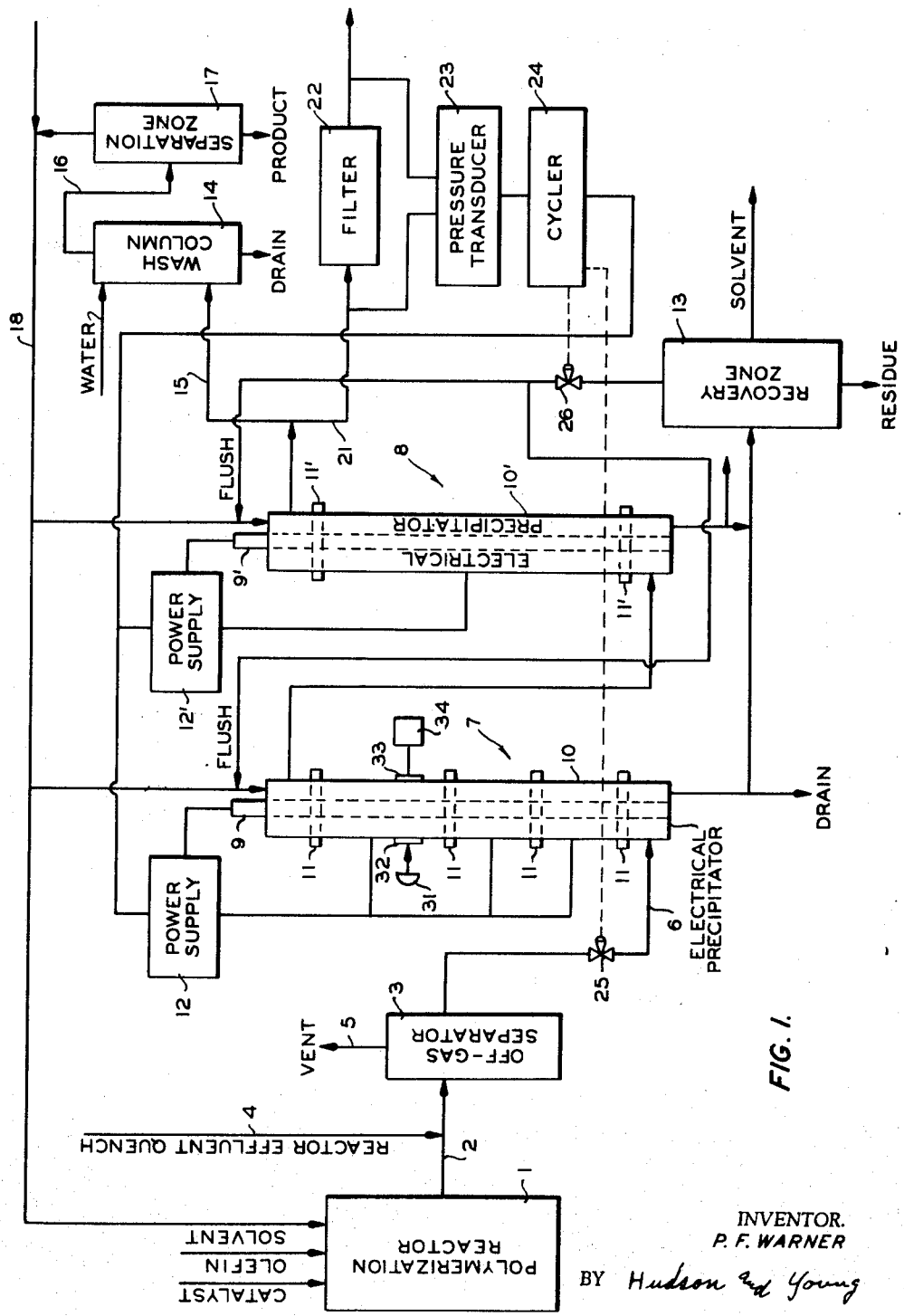

The solution containing the gel and/or catalyst is subjected to a direct current electrostatic field by passing the solution through a vessel comprising an annular electrode and a center electrode. The center electrode can be a round, smooth electrode of constant diameter such as a metal tube or rod; or it can be a sharp edged electrode such as a square metal bar which has been twisted. The center electrode can be of constant cross-sectional area or it can be tapered from top to bottom so that the feed enters at a region of wide electrode spacing and progresses through a region of gradually decreasing electrode spacing. Center electrodes having a smooth surface, such as a round electrode, are somewhat more efficient in removing gel and/or catalyst but they tend to become fouled with gel or catalyst and therefore require periodical cleaning. The sharp edged electrodes, such as an electrode made by twisting a square bar, e.g., keystock, appears to slough off the gel or catalyst attracted thereto but the twisted electrode is somewhat less efficient than a smooth electrode in removing gel and/or catalyst from a polymer or polymer solution.

The feed to the precipitator will usually contain conductive materials such as catalyst, water, etc., therefore, the potential gradient across the electrodes may be somewhat limited. I prefer, therefore, to operate the precipitation in stages so that the voltage gradient is at first relatively low so as to remove conductive material and also to remove the larger particles of gel in the first stage. In the succeeding stage or stages, the voltage gradient can be increased to remove the more difficultly removable material. This can be accomplished in a plurality of stages with straight electrodes or with one stage with a tapered electrode.

The present invention is particularly applicable to the simultaneous removal of gel and catalyst residue from solutions of high molecular weight polybutadiene in a polymerization process effluent. It is also applicable to the removal of gel from a catalyst-free and solvent-free product. If a solvent-free product is used, it must be of such a molecular weight that the viscosity is sufficiently low to permit migration of the impurity therethrough so as to accomplish agglomeration of the gel particles. In processing high molecular weight liquid polybutadiene (molecular weight—1,000–3,000), it is preferred to have the solution contain not more than about 40 or 50 percent polymer. The process is equally applicable to the removal of gel from a quenched reactor effluent during the manufacturing process or from the finished product. In those cases where the gel removal step is used in conjunction with the manufacturing process, it is preferred to install it immediately after the reactor effluent is quenched, because the catalyst residue material is also simultaneously removed and the use of conventional catalyst residue removal equipment is thereby eliminated. When the invention is used primarily for the removal of gel, it is preferred that the feed be substantially dry, but for the removal of catalyst residue material, best results are obtained by using an acid wash, prior to the precipitation step. Acids such as hydrochloric, sulfuric, phosphoric and nitric acid can be used. The electrostatic field can be used either for agglomeration of the gel particles or for precipitation of the inorganic catalyst residue material, or a combination of the two. Operating conditions can be adjusted so that all of the impurities are deposited on the electrodes or operating conditions can be adjusted so that at least a major portion of the material leaves the electrostatic field in an agglomerated condition so that it can easily be removed by conventional means such as a centrifuge or a coarse filter medium.

The reactor effluent stream is treated so as to quench the reaction by destroying the active catalyst as quickly as possible. Thus, the reactor effluent stream is treated with a suitable material, such as methyl alcohol, so as to convert the alkali metal catalyst to an alkali metal salt, such as sodium methylate (sodium methoxide). Other suitable materials for quenching the reaction by destroying the catalyst include oxygen-containing materials such as low molecular weight alcohols, formic acid, acetic acid, carbon dioxide, and methyl carbitol.

It is believed that the impurities referred to as gels result from cross-linking of the polymer produced in the reaction and the reason for quenching the reaction immediately following the reaction vessel is to discourage formation of these materials. An indication of the amount of gel present in a polymer, and consequently, the filterability of the polymer, can be obtained by making a thin film of the polymer and determining the frequency of detectable particles referred to as "fish eyes." The fisheye count does not always reflect the true filterability of the product but does provide an indication of the presence of gels which can affect filterability. In every instance, however, polymer treated according to the present invention has displayed improved filterability characteristics and lower fish-eye count as compared to the charge material. Although I do not fully understand the forces which bring about the agglomeration and precipitation of the gel form a polymer solution, I have found that subjecting the polymer solution to an electrostatic field results in a preferential accumulation and separation of cross-linked polymeric material referred to as gel from linear polymers. Furthermore, I have found that a direct-current electrostatic field accomplishes the desired agglomeration whereas an alternating current does not accomplish the desired selective accumulation. Voltages in the range of 800 to 33,000, based on one inch electrode spacing, can be used for gel and catalyst removal.

FIGURE 1 of the attached drawing illustrates one embodiment of the invention, however, it will be obvious to those skilled in the art and in possession of the disclosure that numerous other embodiments are within the scope of the invention. The process described in connection with FIGURE 1 of the drawing relates to the polymerization of butadiene to a viscous liquid in the presence of a finely divided metallic sodium catalyst and a normal heptane diluent, but the description of the embodiment should not be considered as limiting the invention. It will be understood that various valves, pumps, and other equipment inherently necessary in the operation of the process will not be illustrated because it is within the skill of one acquainted with this art to provide such necessary auxiliary equipment.

A butadiene polymerization reaction such as that described in U.S. 2,631,175 is conducted in reactor 1 and the effluent from the reactor is passed through conduit 2 to separator 3 together with a stoichiometric excess of quench material, such as alcohol, added to the reactor effluent via conduit 4 so as to convert all of the sodium catalyst to sodium methylate. Normally, only non-condensible gases such a hydrogen are vented from the separator 3 via conduit 5; however, if desired, any excess of alcohol and even a portion of the normal heptane diluent can also be removed via conduit 5. If desired, the solution can be given an acid wash following the separation step in separator 3. The resulting polymer solution is passed via conduit 6 to a two-stage electrical precipitator comprising stages 7 and 8. The precipitators comprise smooth, uniform diameter center electrodes 9 and 9', annular electrodes 10 and 10', insulators 11 and 11', and power supply means 12 and 12'. In the embodiment shown, two sections are illustrated, but any number, including one, can be used if desired. In the embodiment shown, the first section or stage is operated principally as an emulsion breaking apparatus wherein a voltage gradient in the range 1100 to 8800 is used. The term "voltage gradient" is used to denote the voltage used where the electrode spacing is one inch. Thus a voltage of 1000 for 0.5 inch spacing would be equivalent to a voltage of 2000 for 1 inch spacing. The permissible voltage in the first stages of precipitation is normally limited due to the conductivity of the solution. After a substantial portion of the electrically conductive materials have been removed, a voltage gradient in the range 11,000 to 28,000 can be used satisfactorily. Direct current is used and both gel and catalyst deposit on the negative electrode or at least migrate toward the negative electrode. When the electrodes have deposited thereon a substantial amount of gel and catalyst, the current is shut off and the precipitators are then flushed with a suitable material. This material is preferably the same as the polymer solvent, but other flush materials can be used when desired. It is also within the scope of the invention to reverse the flow of current during the washing step but it is preferred to shut off the current entirely. The flush material leaving the precipitators can either be discarded or passed to a suitable recovery unit 13.

The optimum time for shutting off the current and flushing the precipitators with wash material can be determined by various means. Thus, a sample stream 21 can be diverted from product line 15 and continually passed through a filter medium 22. When the effectiveness of the precipitators begins to decrease as a result of material deposited on the electrodes, the increased back pressure created in the filter medium can be converted to a signal by pressure transducer 23 to operate automatic cycler 24 so as to shut off the current to the precipitators, to close valve 25 stopping the feed of polymer to the precipitators and to open valve 26 so as to start a flow of flush material to wash the electrodes of the precipitators; after which the flow of the wash material is discontinued, potential is again applied to the precipitators and the flow of polymer solution is resumed. Another method of determining the saturation point of the precipitators is to direct a beam of radiation through the precipitators to a detector, such as an "electric eye," so that an interruption in the beam of radiation caused by accumulation of gel and catalyst will intiate operation of the automatic cycler. Thus, radiation can be caused to pass from source 31 through sight glasses 32 and 33 to detector 34 which can be connected to cycler 24.

The polymer solution leaving the precipitators via conduit 15 is now essentially gel and catalyst free and is passed to a water wash vessel 14. The water washed solution is then passed via line 16 to separation zone 17, wherein the product is recovered essentially solvent-free and the solvent is recovered and all or a portion of it is recycled to reactor 1 via conduit 18.

Figure 3:
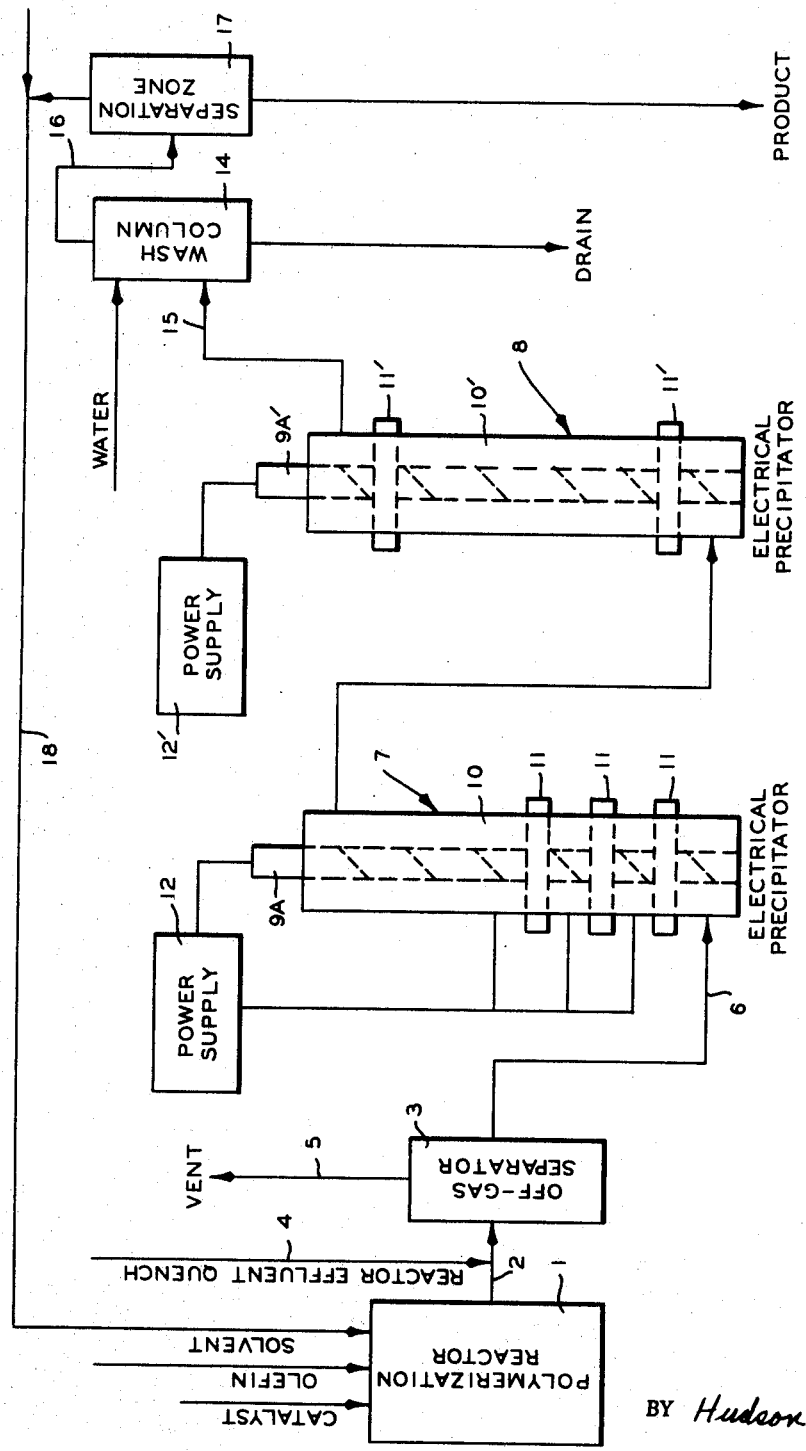
FIGURE 3 is a schematic flow diagram of a modification of the embodiment of FIGURE 1.

Reference is now made to FIGURE 3 wherein a modification of the invention is utilized in a process similar to that illustrated in FIGURE 1. In the present modification the center electrodes 9A and 9A' as shown in precipitators 7 and 8 are twisted electrodes as hereinbefore described. In the modification of FIGURE 3, the process is continuous and the flush cycle is eliminated because the twisted electrodes are self-cleaning.

Figure 4:
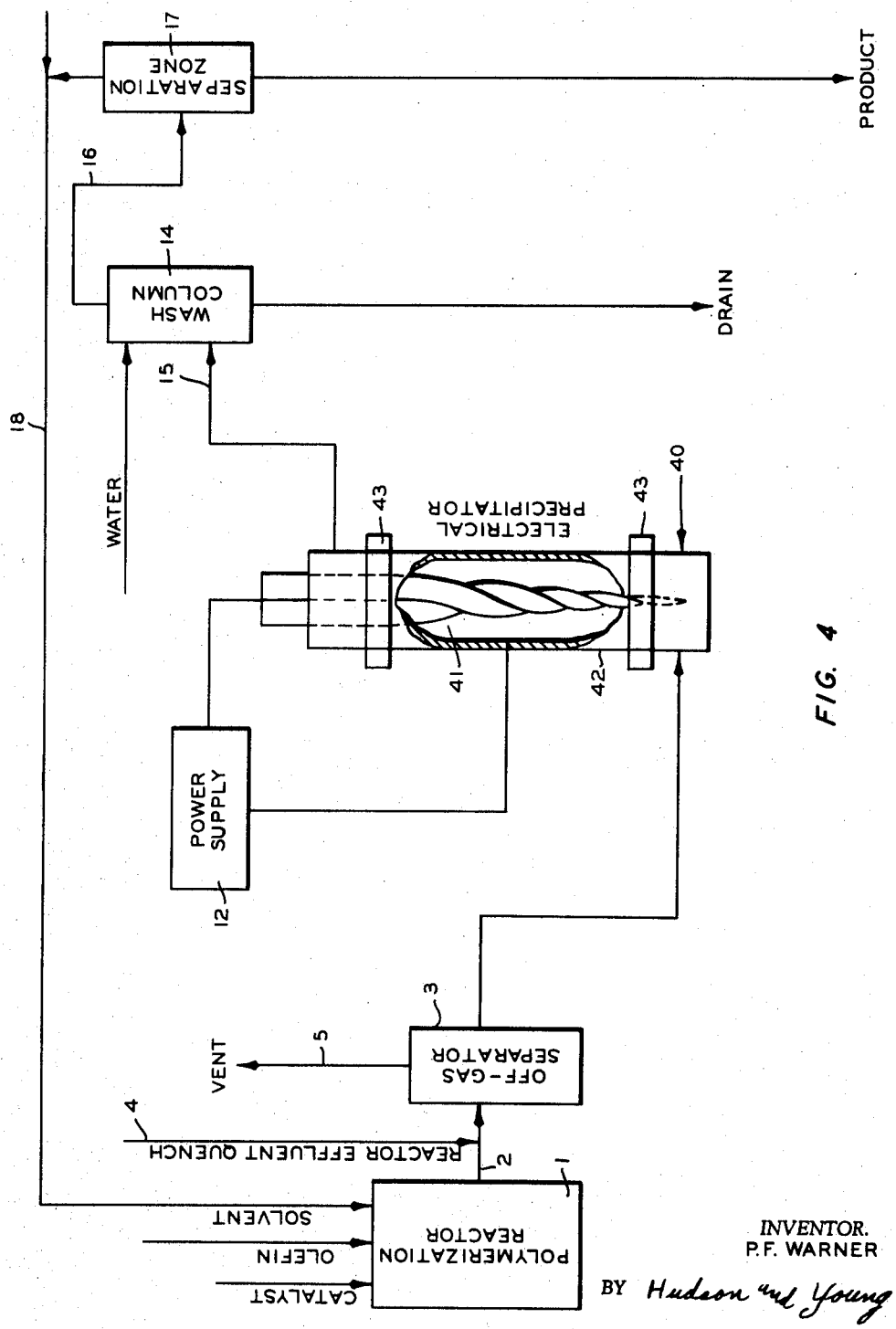
FIGURE 4 is a schematic flow diagram of another modification of the embodiment of FIGURE 1.

Reference is now made to FIGURE 4 wherein another modification of the invention also is illustrated as applied to the process of FIGURE 1. In the modification of FIGURE 4 precipitator 40 differs from the precipitators of FIGURES 1 and 3 in that a tapered electrode is utilized thus obviating the necessity for two stages of precipitators as shown in FIGURES 1 and 3. The annular electrode 42 is of constant diameter whereas the diameter of electrode 41 decreases from the effluent end of the precipitator to the inlet end of the precipitator. The tapered electrode can either be a smooth or twisted electrode and is shown in FIGURE 4 as a twisted electrode wherein the flushing cycle of FIGURE 1 is not required. If a smooth, tapered electrode is employed, then it will be advantageous to utilize the flush cycle as shown in FIGURE 1.

A smooth surface center electrode is more efficient in removing gel but the gel adheres to the surface of such electrode so that periodical cleaning of the electrode is required in order that the efficiency of the electrode be maintained, but a center electrode having sharp edges, such as that provided by twisting a square rod, is essentially self cleaning because the gel does not adhere to such surface. A twisted electrode is only slightly less efficient than a smooth electrode for removing gel and catalyst.

The following specific examples further illustrate the advantages of the process of this invention.

EXAMPLE I

In an apparatus constructed substantially as that shown in FIGURE 1, the electrodes 10 and 10', were 1 inch outside diameter stainless steel tubing and electrodes 9 and 9' were ⅜ inch copper tubing. Direct current voltages applied to sections 7 and 8 were 800 and 5000, respectively. The electrode spacing was 0.34 inch. Normal heptane having about 50 percent liquid polybutadiene dissolved therein was fed to the precipitator at approximately 200 milliliters per hour. The catalyst content of the first and second stage effluent streams was 0.0712 and 0.0145, respectively. The fish-eye count of the first and second stage effluent streams were 52 and 0.8 fish eyes per square inch, respectively. The first stage effluent was charged to the second stage as produced. This run is identified as run No. 1.

The advantages of the process of this invention are further illustrated by the results of runs shown in the following Table I.

Table I

| Run No. | Methanol, ml./gal. | Volts | | Fish-Eyes/sq. in. | | Catalyst, Wt. Percent | |
|---|---|---|---|---|---|---|---|
| | | First Stage | Second Stage | Charge | Second Stage Effluent | Charge | Second Stage Effluent |
| 2 | 200 | 800 | 5,000 | 400 | 92 | 2.0+ | 0.067 |
| 3 | 400 | 5,000 | 5,000 | 400 | 1.4 | 2.0+ | 0.070 |
| 4 | | 5,000 | 5,000 | 44 | 5 | | 0.02 |
| 5 | | 5,000 | 5,000 | 34 | 10 | | 0.054 |

Improvement in filterability is indicated by the data shown in Table II.

Table II

| Run No. | Fish-Eyes/Sq. In. | Before Precipitator—Seconds/50 ml. through paper | | After Precipitator—Seconds/50 ml. through paper | |
|---|---|---|---|---|---|
| | | First 50 ml. | Second 50 ml. | First 50 ml. | Second 50 ml. |
| 4 | 44 | (1) | (1) | 132 | 160 |
| 5 | 34 | (2) | (2) | 185 | 388 |

[1] Filter plugged after first 25 ml.
[2] Filter plugged after first 10 ml.

The filtration rates were determined at 100 mm. Hg absolute pressure (585 mm. Hg pressure differential across the paper) using a 6.6 cm. Buchner funnel and Whatman No. 42 filter paper.

Figure 2:
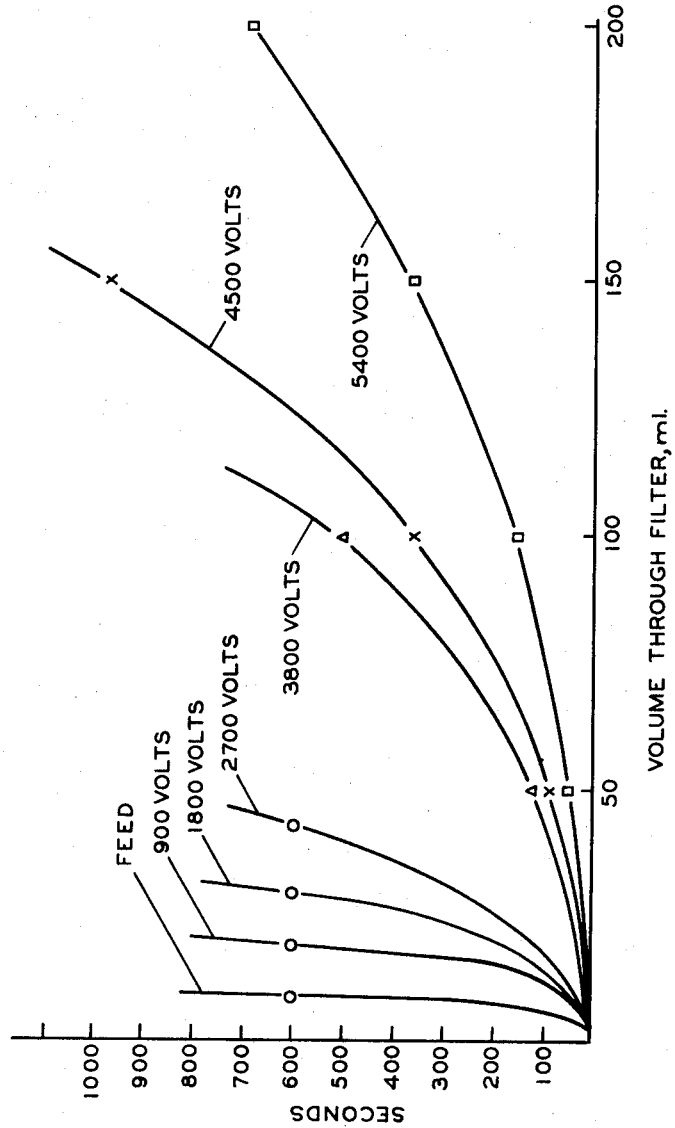
FIGURE 2 is a family of curves illustrating increased filterability of a polymer solution subjected to increased voltage across the electrostatic field.

The family of curves shown in FIGURE 2 represents the results of a series of runs made on finished polybutadiene having 44 fish-eyes per square inch. The flow rate through the precipitators was in each run 5 volumes of polymer per volume of precipitator per hour. The spacing between the electrodes was, in each run, 0.18 inch.

EXAMPLE II

An extraction test has been devised to determine the gel content of polymers. The test comprises extraction of the soluble polymer from the insoluble polymer (gel) using an extraction solvent (benzene in the extraction of polybutadiene) and a porous Alundum thimble to retain the gel. The gel content is determined directly from the difference in weight of the dried thimble before and after the test. A correction for ash can be made by burning off the gel in a muffle furnace at about 1000 to 1200° F., cooling and reweighing the thimble. The difference in weights is the gel content.

The gel content of samples of polybutadiene, as determined by the extraction method, is compared to "fish-eye" count in Table III.

Table III

| Polybutadiene Lot No. | Fish-Eyes/sq. in. | Filterability, ml. in 10 min. | Gel Content, Wt. percent |
|---|---|---|---|
| 6 | 8 | 40 | 0.0209 |
| 7 | 10 | 10 | 0.0579 |
| 8 | 16 | 16 | 0.0855 |
| 9 | 21 | 21 | 0.0938 |
| 10 | 34 | 10 | 0.1050 |

A comparison of gel content, as determined by the extraction method, of polybutadiene samples before and after electrical precipitation is shown in Table IV.

Table IV

| Polybutadiene Lot No. | Electrical Precipitation | Gel Content, wt. percent |
|---|---|---|
| 10 | No | 0.1050 |
| 10 | Yes | 0.0196 |
| 11 | No | 0.0320 |
| 11 | Yes | 0.0095 |

No correction was made for ash in Tables III and IV because the ash content was known to be very low.

EXAMPLE III

In the following runs a twisted electrode, made from ½ inch keystock and twisted at the rate of 4 turns per foot, was compared with a smooth electrode made from ¾ inch (outside diameter) brass pipe. The annular (neutral) electrode was, in each case, a steel pipe having an inside diameter of 1.05 inches so that the spacing for the smooth electrode was 0.15 inch and for the twisted electrode (corner to pipe) was 0.18 inch. Liquid polybutadiene, having a filterability characteristic of 10 to 15 ml. in 600 seconds, was fed to each precipitator at the rate of 5 volumes per volume per hour. The voltage gradient per inch was 30,000 volts in each precipitator. The effluent from each precipitator was passed through a coarse filter (facial tissue) to remove agglomerated gel particles and then subjected to filtration as described in Example II.

Results of the runs are shown in Table V.

Table V

| Volumes through Precipitator | Time for Volume Shown to Pass Filter, seconds | | | | | | | |
|---|---|---|---|---|---|---|---|---|
| | Electrode Type Smooth | | | | Twisted | | | |
| | 50 ml. | 100 ml. | 150 ml. | 200 ml. | 50 ml. | 100 ml. | 150 ml. | 200 ml. |
| 1 | 70 | 210 | 495 | 1,065 | 60 | 140 | 240 | 370 |
| 6 | 95 | 345 | 140 ml./945 sec | | 50 | 105 | 190 | 305 |
| 12 | 60 | 165 | 370 | 805 | 90 | 300 | 805 | 180/1,405 |
| 18 | 155 | 95/755 | | | 80 | 280 | 860 | 170/1,460 |
| 21 | 410 | 60/1,010 | | | 85 | 320 | 145/920 | |
| 24 | | | | | 90 | 325 | 135/925 | |
| 27 | | | | | 75 | 310 | 140/910 | |
| Charge | 10/600 | | | | 10/600 | | | |

A precipitator was constructed with a vessel of constant inside diameter of 1.05 inches and a tapered center electrode 2 feet long having a top diameter of ¾ inch and a bottom diameter of ³⁄₁₆ inch. A voltage was applied to the electrodes and adjusted to 30,000 volts per inch at the top of the center electrode. The vessel wall provided the annular electrode.

The feed to the bottom of the precipitator comprised methanol quenched reactor effluent from metallic sodium catalyzed polymerization of butadiene-1,3 in normal heptane solvent as described in U.S. 2,631,175 issued March 10, 1953 to W. W. Crouch. The reactor effluent was charged to the precipitator at the rate of 1 volume of feed per 1 volume of precipitator per hour. The overhead product was filtered through facial tissue paper to remove coagulated gel and catalyst particles. The feed had an ash content of 2.5 weight percent and the filtered effluent had an ash content of 0.12 weight percent. No arcing occurred as evidenced by a current measurement of 0.2 milliampere.

Although the invention is described as specifically directed to the removal of gel or cross-linked polymer from a linear polymer of butadiene it is also applicable to the separation of cross-linked polymer from other linear polymers, such as a solution of solid polyethylene produced in the presence of a chromium oxide catalyst. A process for producing solid, linear polymers of ethylene is described in copending application Serial Number 573,877 now U.S. Pat. No. 2,825,721, filed March 26, 1956.

The invention is also applicable to the removal of gel from synthetic rubber, such as butadiene/styrene copolymers. In the removal of gel from rubber the preferred method is to dissolve the dried crumb rubber in a suitable solvent, such as benzene or toluene and to pass the solution through the precipitators so as to separate and remove the gel. The precipitator effluent is then flash distilled to remove the solvent and recover the gel-free rubber.

Reasonable variations and modifications are possible within the scope of the present disclosure of the invention, the essence of which is the discovery that gels and solid catalyst can be removed from a solution of a polymer by subjecting the solution to the influence of an electrostatic field to precipitate or agglomerate such material.

That which is claimed is:

1. The method of removing gel, which is an insoluble by-product in the production of a linear polymer in the presence of an inert organic solvent, from a solution containing said gel in admixture with a solution of said linear polymer in said solvent which comprises subjecting the solution to a direct current electrostatic field of sufficient voltage to agglomerate gel; removing agglomerated gel; and recovering polymer solution of reduced gel content.

2. The method of removing gel, which is a by-product in the polymerization of butadiene to form polybutadiene, from admixture with a solution of polybutadiene in an organic solvent which comprises subjecting the admixture to a direct current electrostatic field of sufficient voltage so as to agglomerate said gel; removing agglomerated gel; and recovering the solution of polybutadiene.

3. The method of removing gel, which is a by-product in the polymerization of butadiene to form polybutadiene, and solid catalyst from admixture with a solution of polybutadiene in an organic solvent which comprises subjecting the admixture to a direct current electrostatic field of sufficient voltage so as to agglomerate said gel and said catalyst; removing agglomerated gel; and recovering said solution of polybutadiene.

4. The method of claim 1 wherein the solution is subjected to a first electrostatic field of sufficient voltage gradient to agglomerate conductive material without arcing in a first zone and the effluent from the first electrostatic field is subjected to a second electrostatic field of higher voltage gradient in a second zone.

5. The method of claim 1 wherein the solution is subjected to an electrostatic field of gradually increasing voltage gradient in a single zone.

6. In the process for producing polybutadiene wherein 1,3-butadiene is polymerized in a polymerization zone in the presence of a finely divided alkali metal catalyst and an inert solvent and wherein gels are formed as a by-product, the improvement which comprises withdrawing from said polymerization zone at least a portion of a mixture of said solvent containing polybutadiene, gel and catalyst; subjecting said portion to an aqueous acid wash; passing said mixture into the influence of a first direct current electrostatic field in the range of 800 to 33,000 volts per inch electrode spacing; passing the effluent from the first electrostatic field into the influence of a second direct current electrostatic field in the range of 800 to 33,000 volts per inch electrode spacing wherein the voltage per inch electrode spacing is higher than in said first electrostatic field; recovering polybutadiene in solvent as the effluent from said second electrostatic field as a product of the process; removing the charge from the electrodes and flushing precipitated gel and catalyst from the electrodes with inert solvent.

7. The process of claim 6 wherein the first and second electrostatic fields are in separate zones.

8. The process of claim 6 wherein the first and second electrostatic fields comprise a region of gradually increasing voltage per inch electrode spacing in a single zone.

9. The method of improving the filterability of a solution of polybutadiene in a liquid hydrocarbon solvent which also contains insoluble impurities resulting from the polymerization of butadiene which comprises subjecting the solution to the influence of a D.C. electrostatic field in the range of 800 to 33,000 volts per inch of electrode spacing whereby the impurities are agglomerated and collected upon said electrodes; and recovering from said electrostatic field a solution of polybutadiene in liquid hydrocarbon solvent having improved filterability characteristics.

10. For use in a system wherein monomers are polymerized in a reaction chamber in the presence of a solid catalyst and an inert solvent for the polymer, apparatus comprising vertical, cylindrical precipitator means for subjecting the polymerization reaction chamber effluent to the influence of a direct current electrostatic field of increasing voltage sufficient to agglomerate catalyst and gel, established in a plane transverse to the upward flow of said polymerization reaction chamber effluent; means for recovering polymer solution from the electrostatic field means; means for measuring the amount of material deposited by said electrostatic field and producing a signal indicative of the amount of material deposited; means responsive to said signal to stop the feed and power to said precipitator means when a predetermined amount of material is deposited; and means for flushing the electrostatic field means to remove material deposited there from said reactor effluent.

11. In a system wherein monomers are polymerized in a reaction chamber in the presence of a solid catalyst and an inert solvent for the polymer, apparatus comprising means for subjecting the polymerization reaction chamber effluent to the influence of a direct current electrostatic field comprising a first and a second vertical, cylindrical precipitator chamber each having inlets and outlets and containing spaced electrodes, one of which is the vertical wall of each of said chambers and the other is an electrode occupying the vertical axis of each of said chambers; power supply means for generating a direct current electrostatic charge upon said electrodes wherein the voltage gradient in said second precipitator chamber is greater than that in said first precipitator chamber; means for recovering polymer solution which comprises a water-wash chamber and a distillation means; and a flushing means comprising means for supplying solvent, means to stop the feed to the precipitators, means to stop the power supply to the electrostatic field and means to pass solvent through the precipitators in a direction countercurrent to the normal flow of feed through said precipitators.

12. Apparatus according to claim 11 wherein the electrode occupying the vertical axis of each of said chambers is twisted about its longitudinal axis.

13. In a system wherein monomers are polymerized in a reaction chamber in the presence of a solid catalyst and an inert solvent for the polymer, apparatus comprising means for subjecting the polymerization reaction chamber effluent to the influence of a direct current electrostatic field which comprises a vertical, cylindrical precipitator vessel, the vertical wall of which constitutes an annular electrode, inlet and outlet means in said vessel, a tapered center electrode positioned in said vessel with the larger cross-sectional area at the upper portion of the vessel; power supply means for generating a direct current electrostatic charge upon said electrodes; means for recovering polymer solution which comprises a water-wash chamber and a distillation means; and flushing means which comprises means for supplying solvent, means to stop the feed to the precipitator, means to stop the power supply and means to pass solvent through the vessel in a direction countercurrent to the normal flow of feed through said precipitator.

14. The apparatus of claim 13 wherein said tapered center electrode is twisted about its longitudinal axis.

15. The method of removing gel, which is a by-product in the polymerization of ethylene to form solid polyethylene, from admixture with a solution of solid polyethylene in an organic solvent which comprises subjecting the mixture to a direct current electrostatic field of sufficient voltage to agglomerate said gel; removing agglomerated gel; and recovering the solution of polyethylene.

References Cited in the file of this patent

UNITED STATES PATENTS

| | | |
|---|---|---|
| 1,838,929 | Fisher | Dec. 29, 1931 |
| 1,990,213 | Winkler et al. | Sept. 6, 1932 |
| 2,073,952 | Shepherd | Mar. 16, 1937 |
| 2,261,108 | Dillon | Nov. 4, 1941 |
| 2,485,335 | Tyson | Oct. 18, 1949 |
| 2,825,686 | Greene et al. | Mar. 4, 1958 |
| 2,914,453 | Wennerberg | Nov. 24, 1959 |